(12) United States Patent
Gase

(10) Patent No.: US 11,447,198 B2
(45) Date of Patent: Sep. 20, 2022

(54) VEHICLE PANEL REMOVAL SYSTEM AND METHOD

(71) Applicant: Rivian IP Holdings, LLC, Plymouth, MI (US)

(72) Inventor: Brian Gase, Ypsilanti, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 86 days.

(21) Appl. No.: 16/908,995

(22) Filed: Jun. 23, 2020

(65) Prior Publication Data

US 2021/0394847 A1    Dec. 23, 2021

(51) Int. Cl.
*B62D 65/06* (2006.01)
*B62D 65/02* (2006.01)
*B60J 5/04* (2006.01)

(52) U.S. Cl.
CPC ............ *B62D 65/06* (2013.01); *B60J 5/0413* (2013.01); *B60J 5/0415* (2013.01); *B60J 5/0469* (2013.01); *B62D 65/024* (2013.01)

(58) Field of Classification Search
CPC ....... B62D 65/06; B60J 5/0413; B60J 5/0415; B60J 5/0469
USPC ...................................................... 296/146.5
See application file for complete search history.

(56) References Cited

U.S. PATENT DOCUMENTS

| | | | | |
|---|---|---|---|---|
| 3,069,197 A | * | 12/1962 | Wernig .................. | B60J 5/0413 49/400 |
| 4,912,827 A | * | 4/1990 | Kohut .................... | B62D 65/06 29/402.13 |
| 2007/0125003 A1 | * | 6/2007 | Wartzack ................ | B60J 10/86 49/502 |

* cited by examiner

*Primary Examiner* — Joseph D. Pape
(74) *Attorney, Agent, or Firm* — Clements Bernard Baratta; Christopher L. Bernard

(57) ABSTRACT

Various disclosed embodiments include structures and methods for improving assembly of vehicle doors. In an illustrative embodiment a vehicle door includes a first door inner structure having an angled wedge bearing surface and configured to receive a first removable attachment mechanism and a second door inner structure configured to receive a second removable attachment mechanism. The door includes a door outer structure having an outer panel coupled to an attachment structure, the attachment structure having an angled wedge bearing surface and having a bearing surface, the bearing surface configured to receive the second removable attachment mechanism, the second bearing surface being configured to abut an inner surface of the second door inner structure. The door includes an adjustment wedge which allows for positioning of the door panel relative to the body side of the vehicle.

19 Claims, 4 Drawing Sheets

VEHICLE PANEL REMOVAL SYSTEM AND METHOD

TECHNICAL FIELD

The present disclosure relates to removal and assembly of door panels for vehicles.

BACKGROUND

The statements in this section merely provide background information related to the present disclosure and may not constitute prior art.

Conventional door outer panels, regardless of architecture, are generally fixed permanently to the inner panel as a rule. Attachment methods vary between bonding and hemming for metal stamped doors to bonding exclusively for composite doors. These methods of affixing the panel involve assembly in a body shop prior to the assembly being painted and then trim parts being assembled.

These assembly sequences entail that door hardware (such as window regulators, door latches, and other content) be loaded inside of the door through a hole in the door inner panel. This hole is then covered by a thin, waterproof layer to seal the door or with a full door module which carries this content as a subassembly.

SUMMARY

Disclosed embodiments include structures and methods for improving the assembly of vehicle doors.

An illustrative embodiment includes a door. The door includes a first door inner structure having an angled wedge bearing surface and configured to receive a first removable attachment mechanism and a second door inner structure configured to receive a second removable attachment mechanism. The door also includes a door outer structure having an outer panel coupled to an attachment structure, the attachment structure having an angled wedge bearing surface and having a bearing surface configured to receive the second removable attachment mechanism, the second bearing surface being configured to abut an inner surface of the second door inner structure. The door further includes an adjustment wedge having a receiving aperture configured to receive the first removable attachment mechanism and having a first bearing surface configured to abut the angled wedge bearing surface of the first door inner structure and a second bearing surface configured to abut the angled wedge bearing surface of the outer door structure.

Another illustrative embodiment includes a vehicle. The vehicle includes a body structure forming a cabin. The vehicle has a propulsion system and at least one wheel coupled to and driven by the propulsion system and further coupled to the body structure, and at least one door for opening and closing the cabin. The at least one door includes a first door inner structure having an angled wedge bearing surface and configured to receive a first removable attachment mechanism and a second door inner structure configured to receive a second removable attachment mechanism. The door further includes a door outer structure having an outer panel coupled to an attachment structure, the attachment structure having an angled wedge bearing surface and having a bearing surface configured to receive the second removable attachment mechanism, the second bearing surface being configured to abut an inner surface of the second door inner structure. Further still the door includes an adjustment wedge having a receiving aperture configured to receive the first removable attachment mechanism and having a first bearing surface configured to abut the angled wedge bearing surface of the first door inner structure and a second bearing surface configured to abut the angled wedge bearing surface of the outer door structure.

Yet another illustrative embodiment includes a method for assembling a vehicle door. The method includes providing a first door inner structure having an angled wedge bearing surface and configured to receive a first removable attachment mechanism. The method also includes providing a second door inner structure configured to receive a second removable attachment mechanism. The method further includes coupling an adjustment wedge having a receiving aperture configured to receive the first removable attachment mechanism and having a first bearing surface configured to abut the angled wedge bearing surface of the first door inner structure and a second bearing surface configured to abut the angled wedge bearing surface of the outer door structure to the first door inner structure. A door outer structure is positioned relative to the second door inner structure, the door outer structure having an outer panel coupled to an attachment structure, the attachment structure having an angled wedge bearing surface and having a bearing surface, the bearing surface being configured to receive the second removable attachment mechanism, the second bearing surface being configured to abut an inner surface of the second door inner structure. The adjustment wedge is adjusted relative to the first door inner structure based on the position of the door outer structure and attaching the door outer structure to the second door inner structure using the second removable attachment mechanism.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
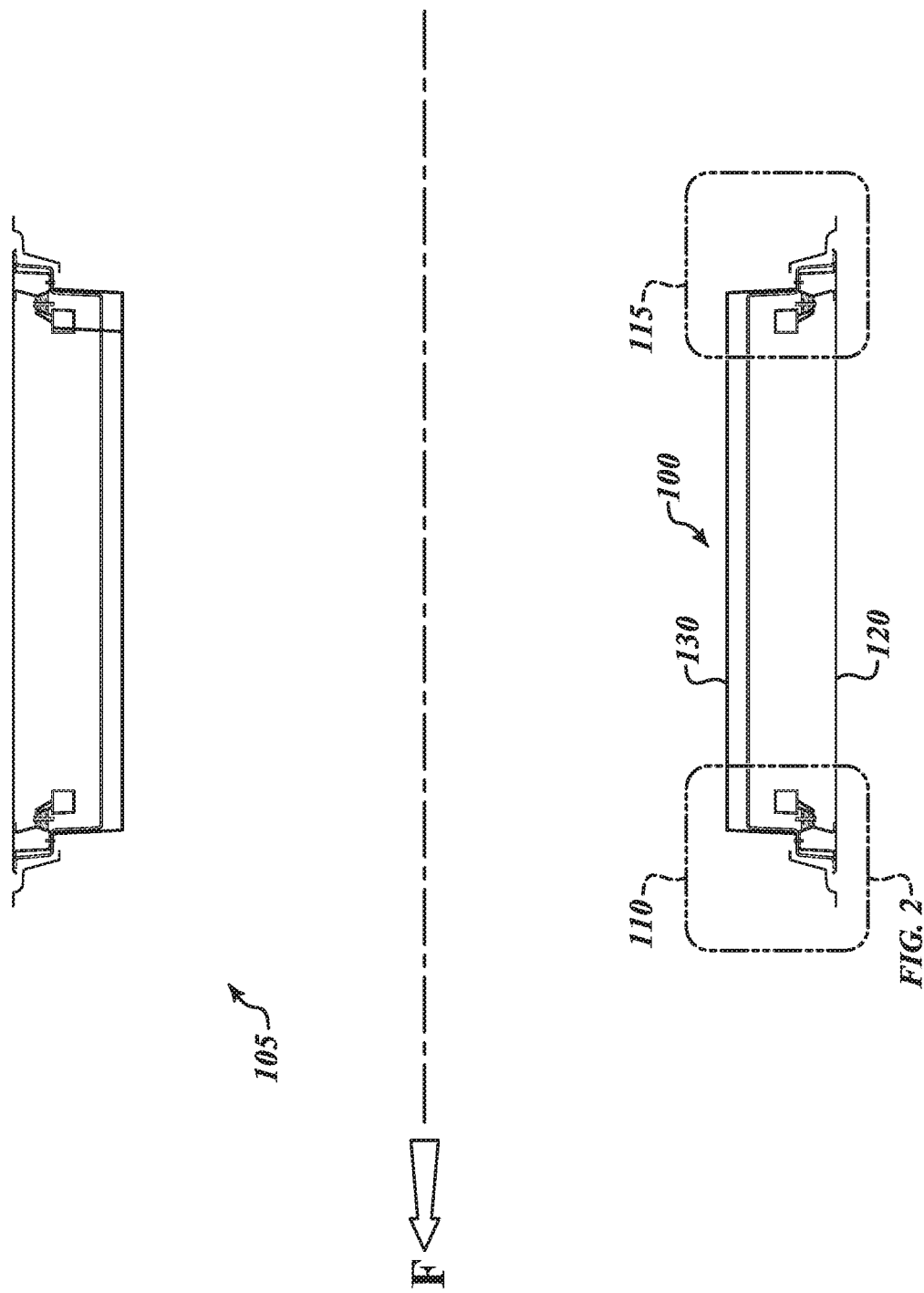
FIG. 1 is a cross sectional view of two illustrative doors using an adjustable attachment mechanism.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

It will be appreciated that, in various embodiments, structure and methods disclosed herein can help contribute to removing a need for a pass-through for assembling equipment within a vehicle door by providing access to the door cavity from the outside with an outer door panel removed.

Referring to FIG. 1, cross sectional views of doors 100 and 105 of a vehicle, with "F" and the arrow representing the front of the vehicle, are depicted. The doors 100 and 105 have the same structure but are on opposite sides of the vehicle. A first attachment structure 110 and a second attachment structure 115 couple the door outer structure or the door panel 120 to the door inner structure 130. First and second attachment structures are illustrative of the same type of attachment structure at different points on the door which is provided with further detail in FIG. 2. There may be more than one of these attachment structures to couple the door panel 120 to the inner door structure 130.

Figure 2:
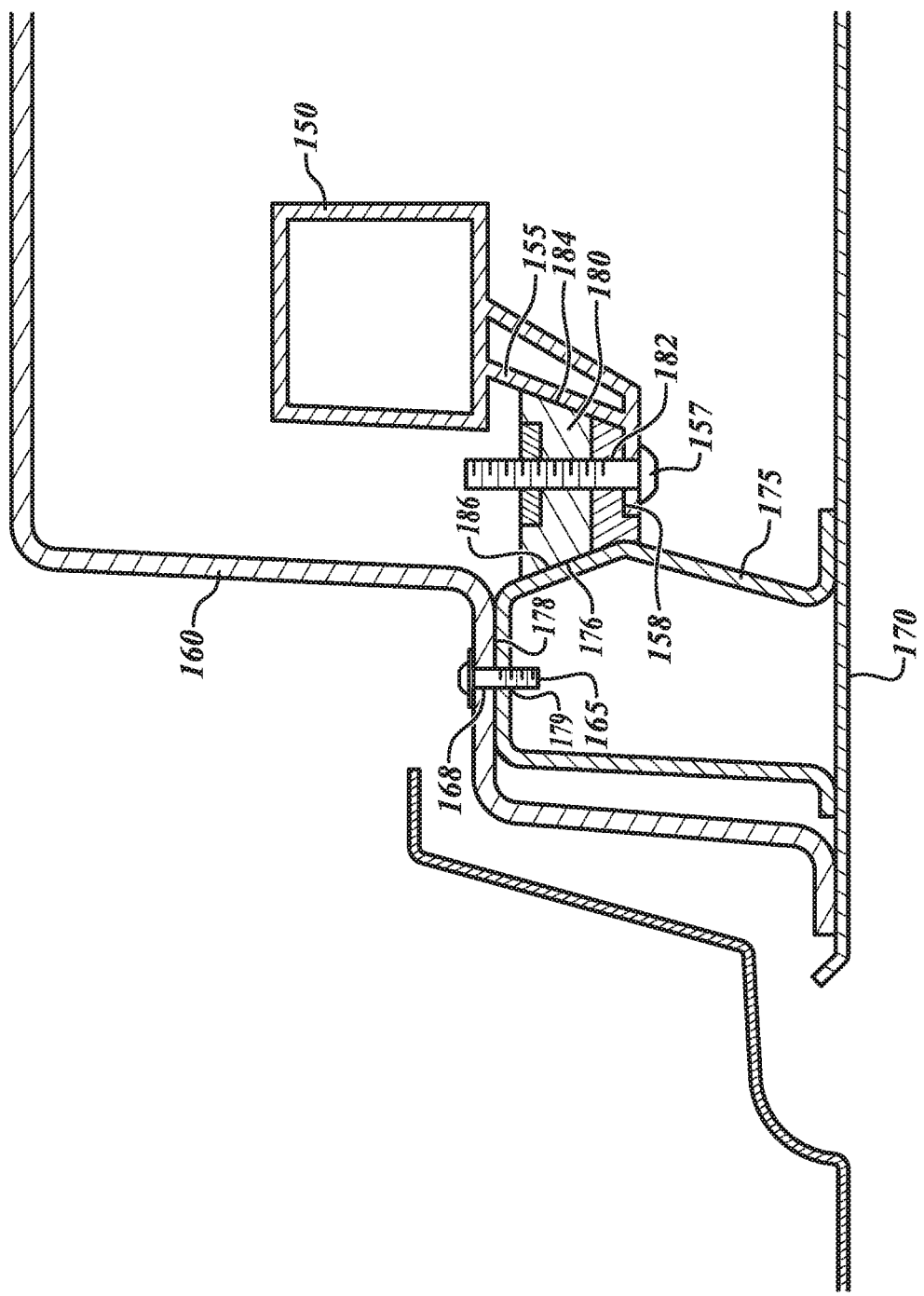
FIG. 2 is a cross sectional view of details of one of the attachment mechanisms of one of the doors of FIG. 1.

Referring both to FIGS. 1 and 2, in accordance with an illustrative embodiment a door 100, which may be any of a variety of doors for vehicles or other doors which entails an inner structure and an outer aesthetic door panel, includes a first door inner structure 150 having an angled wedge bearing surface 155 and configured to receive a first removable attachment mechanism or adjustment screw 157 at an aperture 158. A second door inner structure 160 is configured to receive a second removable attachment mechanism or screw 165 through an aperture 168. A door outer structure includes a door outer structure or door panel 170 coupled to an attachment structure 175. Attachment structure 175 has an angled wedge first bearing surface 176 and a second bearing surface 178, the second bearing surface 178 being configured to receive the second removable attachment mechanism or screw 165 through an aperture 179. The second bearing surface 178 is configured to abut an inner surface of the second door inner structure 160. An adjustment wedge 180 has a receiving aperture 182 configured to receive the first removable attachment mechanism or screw 157. The adjustment wedge 180 has a first bearing surface 184 configured to abut the angled wedge bearing surface 155 of the first door inner structure 150 and a second bearing surface 186 configured to abut the angled wedge first bearing surface 176 of the attachment structure 175.

In accordance with an illustrative embodiment, the second door inner structure 160 receives the second removable attachment mechanism or screw 165 through the second door inner structure aperture 168 and the second door inner structure aperture 168 can be accessed on a side opposite the door outer structure or opposite the door panel 170. This allows an installer to easily access the screw 165 from the interior side of the vehicle. In various embodiments the outer door structure attachment structure 175 includes a post as shown in FIG. 2 as the attachment structure 175. In various embodiments the post may be a hollowed post. However, in some other embodiments a solid post may be used.

In various embodiments the adjustment wedge 180 allows for the first removable attachment mechanism or screw 157 to provide relative adjustment of the door panel 120 relative to both the first door inner structure 150 and the second door inner structure 160.

Figure 3:
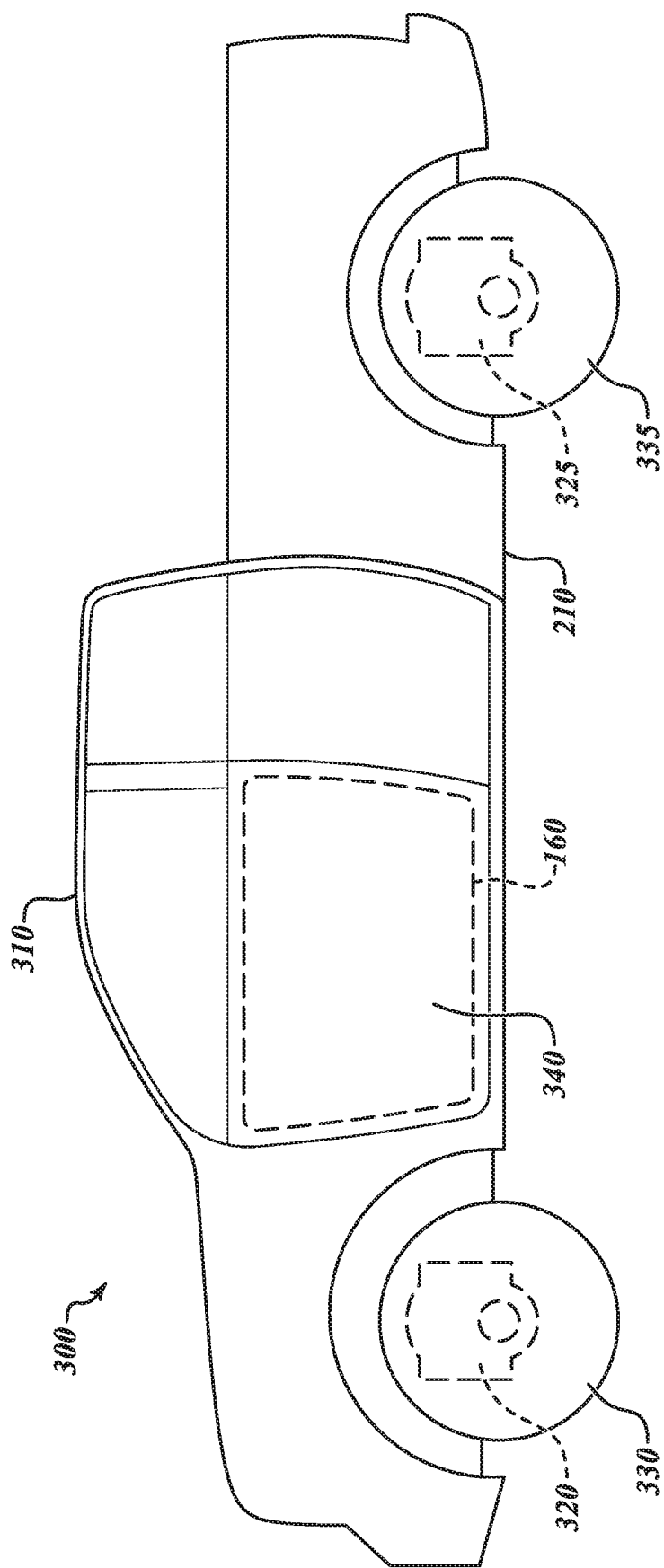
FIG. 3 is a perspective view of an illustrative vehicle having doors which incorporate various illustrative embodiments.
Figure 4:
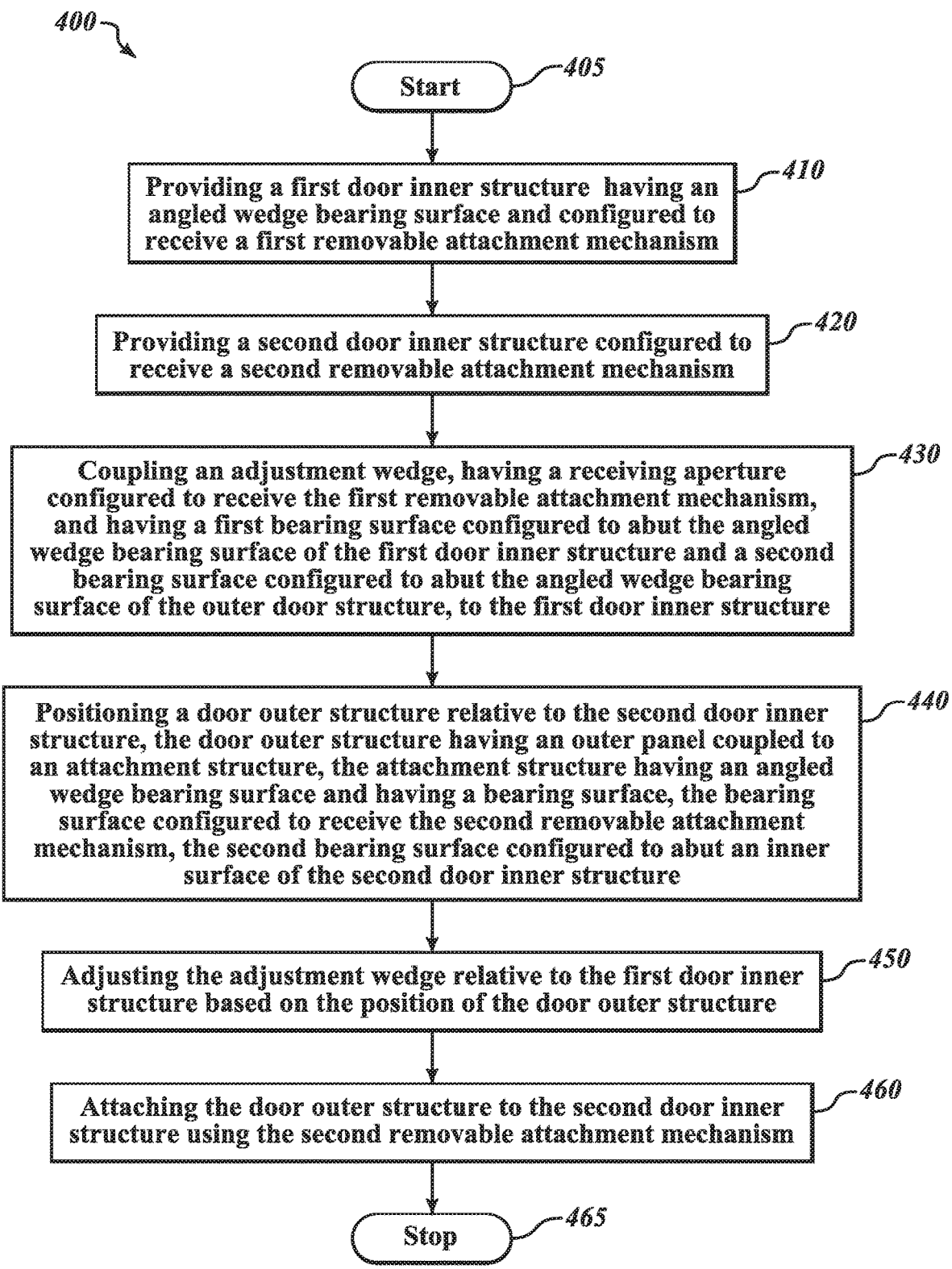
FIG. 4 is a flow chart of an illustrative method for assembling an illustrative door assembly.

Referring now to FIG. 3, a vehicle 300 may be any of a variety of vehicles including but not limited to trucks, cars, trains, buses, SUVs, etc. all of which have a body structure 310 forming a cabin, a propulsion system, such as but not limited to electric motors 320 and 325 which drive front wheels 330 and rear wheels 335 respectively. The propulsion system may be any type including but not limited to electric motors, diesel engines, gasoline engines, hybrid engines, and the like.

In various embodiments the vehicle 300 also includes at least one door 340 for opening and closing the cabin. Referring back to FIGS. 1 and 2, the at least one door 340 includes a first door inner structure 150. The at least one door 340 also includes an angled wedge bearing surface 176 and is configured to receive a first removable attachment mechanism or screw 157. The second door inner structure 160 is configured to receive a second removable attachment mechanism or the screw 165.

In various embodiments outer structure of the door includes the door panel 170 coupled to the attachment structure 175. The attachment structure 175 has an angled wedge first bearing surface 176 and has the second bearing surface 178. The second bearing surface 178 is configured to receive the second removable attachment mechanism or the screw 165. The second bearing surface 178 is configured to abut an inner surface of the second door inner structure 160. The adjustment wedge 180 has the receiving aperture 182 configured to receive the first removable attachment mechanism or the screw 158. The adjustment wedge 180 also has the first bearing surface 184 configured to abut the angled wedge bearing surface of the first door inner structure 150 and the second bearing surface 186 configured to abut the angled wedge bearing surface or the first bearing surface of the outer door structure 170.

An illustrative embodiment includes a method 400 of assembling a door structure beginning at a Start block 405. The method 400 includes in a block 410 providing a first door inner structure that has an angled wedge bearing surface and is configured to receive a first removable attachment mechanism and in a block 420 providing a second door inner structure that is configured to receive a second removable attachment mechanism. In a block 430 the method 400 includes coupling an adjustment wedge, having a receiving aperture that is configured to receive the first removable attachment mechanism, and having a first bearing surface that is configured to abut the angled wedge bearing surface of the first door inner structure and a second bearing surface that is configured to abut the angled wedge bearing surface of the outer door structure, is coupled to the first door inner structure. Method 400 further includes in a block 440 positioning a door outer structure relative to the second door inner structure. The door outer structure has an outer panel coupled to an attachment structure, the attachment structure has an angled wedge bearing surface and has a bearing surface, the bearing surface is configured to receive the second removable attachment mechanism. The second bearing surface is configured to abut an inner surface of the second door inner structure. Further still, in a block 450 the method 400 includes adjusting the adjustment wedge relative to the first door inner structure based on the position of the door outer structure. Yet further still, the method 400 includes in a block 460 attaching the door outer structure to the second door inner structure using the second removable attachment mechanism. The method 400 is ended at a Stop Block 465.

Utilizing illustrative embodiments, the door outer panel may be attached in such a way that it is easily removed when needed. The attachment points may be located just inside of the primary door seal and the attachment of the outer door panel to the inner door structure is made using screws, bolts, or other like attachment mechanisms. To ensure the fit is accurate, adjustable wedges or blocks are located at the front and rear of the inner panel that help line up the outer panel and allow some adjustability to its location relative to the inner door structure. Illustrative adjustment blocks are shaped like a wedge and slide toward and away from the interior of the vehicle. If the panel is too far forward or rearward, the blocks can be adjusted accordingly until the fit is aligned. This alignment assists in maintaining the door margin and flushness without needing to adjust the hinges of the door.

By assembling the outer door panel to the inner door structure in this way, the door panel acts like a bolt on trim component. When the panel is damaged, it can be easily removed and replaced without additional body work and painting.

From a manufacturing standpoint, the outer panel of the door can be added late in the vehicle assembly. This means that the interior components can be assembled without the panel obstructing. This provides greater freedom in the assembly process than in conventional vehicles. In a conventional assembly, the outer panel is a structural component typically hemmed and welded to the inner panel. As such, it is in place before any interior components can be added. With this structure, the components are added before the outer panel is finally coupled to the door inner structure.

The illustrative embodiments of structures and methods provide for advantages in assembly, service, and provide the opportunity to replace a door panel as a bolt on trim component without the need for body work or paint. The illustrative embodiments of structures and methods will allow for quicker service times and less service complexity. A damaged door outer panel typically entails body and paint work to repair. The ability to remove the panel and replace it reduces the overall maintenance cost. In addition, the ease of service for door hardware and other content further reduces the overall maintenance cost.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context entails otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A door comprising:
    a first door inner structure having an angled wedge bearing surface and being configured to receive a first removable attachment mechanism;
    a second door inner structure configured to receive a second removable attachment mechanism;
    a door outer structure having an outer panel coupled to an attachment structure, the attachment structure having an angled wedge bearing surface and having a bearing surface, the bearing surface being configured to receive the second removable attachment mechanism, the second bearing surface being configured to abut an inner surface of the second door inner structure; and
    an adjustment wedge having a receiving aperture configured to receive the first removable attachment mechanism and having a first bearing surface configured to abut the angled wedge bearing surface of the first door inner structure and a second bearing surface configured to abut the angled wedge bearing surface of the attachment structure.

2. The door of claim 1, wherein the first door inner structure is configured to receive the first removable attachment mechanism through a first door inner structure aperture.

3. The door of claim 1, wherein the second door inner structure is configured to receive the second removable attachment mechanism through a second door inner structure aperture.

4. The door of claim 1, wherein the second door inner structure is configured to receive the second removable attachment mechanism through a second door inner structure aperture and the second door inner structure aperture is configured to be accessible on a side opposite the door outer structure.

5. The door of claim 1, wherein the door outer structure attachment structure includes a post.

6. The door of claim 1, wherein the door outer structure attachment structure includes a post and the bearing surface is a portion of the post that receives the second removable attachment mechanism through an aperture in the post.

7. The door of claim 1, wherein the adjustment wedge and the first removable attachment mechanism are configured to provide relative adjustment of the door outer structure relative to both the first and second door inner structures.

8. The door of claim 1, wherein the first removable attachment mechanism includes a screw.

9. The door of claim 1, wherein the second removable attachment mechanism includes a screw.

10. A vehicle comprising:
a body structure forming a cabin;
a propulsion system;
at least one wheel coupled to and driven by the propulsion system, the at least one wheel being coupled to the body structure; and
at least one door for opening and closing the cabin, the at least one door including:
a first door inner structure having an angled wedge bearing surface and being configured to receive a first removable attachment mechanism;
a second door inner structure being configured to receive a second removable attachment mechanism;
a door outer structure having an outer panel coupled to an attachment structure, the attachment structure having an angled wedge bearing surface and having a bearing surface, the bearing surface being configured to receive the second removable attachment mechanism, the second bearing surface being configured to abut an inner surface of the second door inner structure; and
an adjustment wedge having a receiving aperture configured to receive the first removable attachment mechanism and having a first bearing surface configured to abut the angled wedge bearing surface of the first door inner structure and a second bearing surface configured to abut the angled wedge bearing surface of the attachment structure.

11. The vehicle of claim 10, wherein the first door inner structure is configured to receive the first removable attachment mechanism through a first door inner structure aperture.

12. The vehicle of claim 10, wherein the second door inner structure is configured to receive the second removable attachment mechanism through a second door inner structure aperture.

13. The vehicle of claim 10, wherein the second door inner structure is further configured to receive the second removable attachment mechanism through a second door inner structure aperture and the second door inner structure aperture is accessable on a side opposite the door outer structure.

14. The vehicle of claim 10, wherein the door outer structure attachment structure includes a post.

15. The vehicle of claim 10, wherein the door outer structure attachment structure includes a post and the bearing surface is a portion of the post that receives the second removable attachment mechanism through an aperture in the post.

16. The vehicle of claim 10, wherein the adjustment wedge and the first removable attachment mechanism are configured to provide relative adjustment of the door outer structure relative to both the first and second door inner structures.

17. The vehicle of claim 10, wherein the first removable attachment mechanism includes a screw.

18. The vehicle of claim 10, wherein the second removable attachment mechanism includes a screw.

19. The vehicle of claim 10, wherein the propulsion system includes an electric motor.

* * * * *